(12) United States Patent
Wang et al.

(10) Patent No.: US 12,361,092 B2
(45) Date of Patent: Jul. 15, 2025

(54) SENSOR CALIBRATION OPTIMIZATION SYSTEM AND METHOD

(71) Applicant: Deepen AI, Inc., Santa Clara, CA (US)

(72) Inventors: Cheuksan Wang, Campbell, CA (US); Naman Jain, Ghaziabad (IN); Krishna Chaitanya Majeti, Hyderabad (IN)

(73) Assignee: Deepen AI, Inc., Santa Clara, CA (US)

( * ) Notice: Subject to any disclaimer, the term of this patent is extended or adjusted under 35 U.S.C. 154(b) by 0 days.

(21) Appl. No.: 17/845,906

(22) Filed: Jun. 21, 2022

(65) Prior Publication Data

US 2023/0409668 A1    Dec. 21, 2023

(51) Int. Cl.
*G06F 17/17*    (2006.01)
*G06F 17/40*    (2006.01)

(52) U.S. Cl.
CPC .............. *G06F 17/17* (2013.01); *G06F 17/40* (2013.01)

(58) Field of Classification Search
CPC ..... G06F 17/17; G06F 17/40703; G06F 17/40
USPC ............................................................ 703/2
See application file for complete search history.

(56) References Cited

U.S. PATENT DOCUMENTS

| | | | | |
|---|---|---|---|---|
| 6,055,477 A * | 4/2000 | McBurney | ............... | G01C 5/00 |
| | | | | 701/469 |
| 9,916,660 B2 | 3/2018 | Singh et al. | | |
| 9,999,728 B2 * | 6/2018 | Parikh | ................ | A61M 5/1723 |
| 10,838,049 B1 * | 11/2020 | Schwiesow | ........... | G01S 7/4972 |
| 10,977,821 B2 | 4/2021 | Schwiesow et al. | | |
| 11,761,765 B2 * | 9/2023 | Dormody | ................ | G01S 5/017 |
| | | | | 701/408 |
| 2007/0288135 A1 * | 12/2007 | Kidd | ................ | G01M 17/0078 |
| | | | | 701/31.4 |
| 2015/0305823 A1 * | 10/2015 | Claus | .................... | A61B 5/061 |
| | | | | 600/424 |

FOREIGN PATENT DOCUMENTS

| | | | | |
|---|---|---|---|---|
| CA | 3008638 | * | 6/2019 | ............ A61B 5/053 |
| CN | 113592957 | * | 8/2021 | |
| CN | 114092566 | * | 11/2021 | |

OTHER PUBLICATIONS

Stereo Vision and Depth Perception in Computer Vision, Oct. 5, 2023, downloaded Feb. 21, 2025, available online at https://sumitkrsharma-ai.medium.com/stereo-vision-and-depth-perception-in-computer-vision-8aff8dd04e7c, 14 pages.*

(Continued)

*Primary Examiner* — Juan C Ochoa
(74) *Attorney, Agent, or Firm* — Lloyd & Mousilli; Benjamin M. Hanrahan (57) ABSTRACT

A system and method for calibration optimization. The system includes a plurality of sensors, a processing circuitry and a memory, the memory containing instructions that, when executed by the processing circuitry, configure the system to receive a signal from a plurality of sensors, perform a calibration on the plurality of sensors, the calibration having a predetermined vector size corresponding to a plurality of parameters of the calibrations, and perform an optimization after the calibration. The optimization includes a minimization that includes applying a loop constraint.

18 Claims, 6 Drawing Sheets

(56) References Cited

OTHER PUBLICATIONS

Zach Wendt et al., Saved By The Sensor: Vehicle Awareness in the Self-Driving Age, Mechanical and Motion Systems, Machine Design, Retrieved from https://www.machinedesign.com/mechanical-motion-systems/Article/21836344/saved-by-the-sensor-vehicle-awareness-in-the=self=driving-age on Feb. 22, 2022, pp. 1-4.

ISR/WO issued in correlated international application No. PCT/US2023/024306 on Jul. 17, 2023.

* cited by examiner

SENSOR CALIBRATION OPTIMIZATION SYSTEM AND METHOD

TECHNICAL FIELD

The present disclosure relates generally to a calibration optimizer, or more specifically, a system and method for optimizing calibration.

BACKGROUND

Sensors are a crucial part of autonomous vehicles, drone navigation, localization, mapping, manufacturing and various other robotics applications. In order to extend the field of view and procure appropriate depth information of the environment, multiple sensors are mounted on different machines to capture the information simultaneously. To ensure that the combined data from different sensors can be used together consistently through sensor fusion, software tools fuse the information from multiple sensors together using sensor calibration parameters. During multiple sensor calibrations, however, minute errors are generated from each calibration.

All users of the calibration results want them to be as accurate as possible to have the best sensor fusion quality. Hence, sufficiently high accuracy of sensor calibration is required for high-quality sensor fusion leading to accurate perception models.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for optimizing calibration. The method includes receiving a signal from a plurality of sensors, performing a calibration on the plurality of sensors, the calibration having a predetermined vector size corresponding to a plurality of parameters of the calibrations, and performing an optimization after the calibration. The optimization includes a minimization that includes applying a loop constraint.

Certain embodiments disclosed herein also include a non-transitory computer readable medium having stored thereon instructions for causing a processing circuitry to execute a process, the process includes receiving a signal from a plurality of sensors selected by a user, performing temporal calibration, forming a calibration loop based on the plurality of sensors, performing an optimization after the temporal calibration is performed, and determining an optimized temporal calibration value by applying a loop constraint based on the formed calibration loop.

Certain embodiments disclosed herein also include a system for optimizing calibration. The system includes a plurality of sensors, a processing circuitry, and a memory. The memory containing instructions that, when executed by the processing circuitry, configure the system to receive a signal from a plurality of sensors, perform a calibration on the plurality of sensors, the calibration having a predetermined vector size corresponding to a plurality of parameters of the calibrations, and perform an optimization after the calibration. The optimization includes a minimization that includes applying a loop constraint.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for calibrating multiple sensors by calculating extrinsic and temporal calibration parameters, and by applying loop constraints to optimize the calibration parameters.

Figure 1:
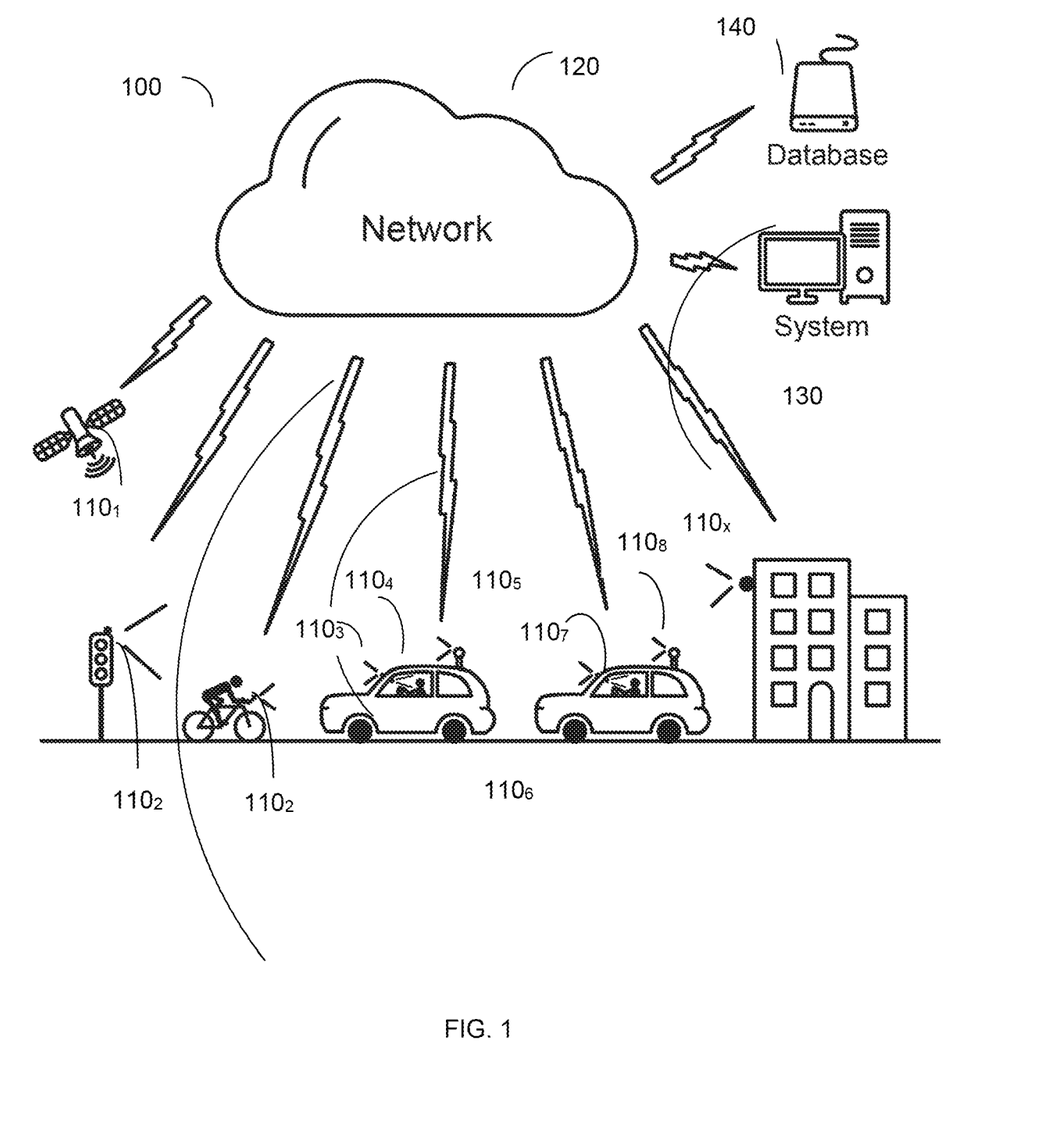
FIG. 1 is an example network diagram utilized to describe the various disclosed embodiments.

FIG. 1 shows an example network diagram 100 utilized to describe the various disclosed embodiments. The diagram 100 includes various sensors $110_1$-$110_x$ (hereinafter individually as sensor 110 or together as sensors 110, for simplicity purposes), system 130 and database 140 that are communicatively connected via the network 120.

In the embodiment, sensors 110 may include our visual, audio, electromagnetic, or other sensors (e.g., video or Infra-red (IR) cameras or LIDAR) mounted on various objects including satellites, infrastructures (e.g., streetlights or buildings), vehicles including bicycle or autonomous vehicles. In case of autonomous vehicles, the sensors may capture the condition of the environment exterior to the vehicle (e.g., camera or LIDAR applications), or inside the passenger cabin.

Signals picked up by the various sensors 110 may be transmitted via the network 120 to the system 130. The system 130 processes to receive signals and, by the methods to be described in detail in the subsequent figures, finds the differences amongst the sensed data, and calibrates and optimizes the calibration to minimize errors. The system 130 may then transmit the data and results via the network 122 to be saved in the database 140.

In operation, the system 130 performs a method that improves calibration accuracy by optimizing calibration amongst multiple sensors that form a closed loop for two types of calibrations: extrinsic and temporal calibrations. The optimization may be performed after each calibration, after installation of the sensors at regular intervals (e.g., daily to weekly). A closed loop is formed amongst multiple sensors 110 when all the calibrations amongst pairs of sensors are calculated so that a path of pairwise calibrations from any sensor to other sensors and back to itself can be completed. Here, the closed loop allows for the optimization and improvement of calibration accuracy, as will be explained in further detail below.

Extrinsic calibration is the 6 degree-of-freedom rigid transformation between two selected sensors 110. Temporal calibration, on the other hand, refers to the difference in timestamps between the two selected sensors 110.

Extrinsic Calibration Optimization

Figure 2:
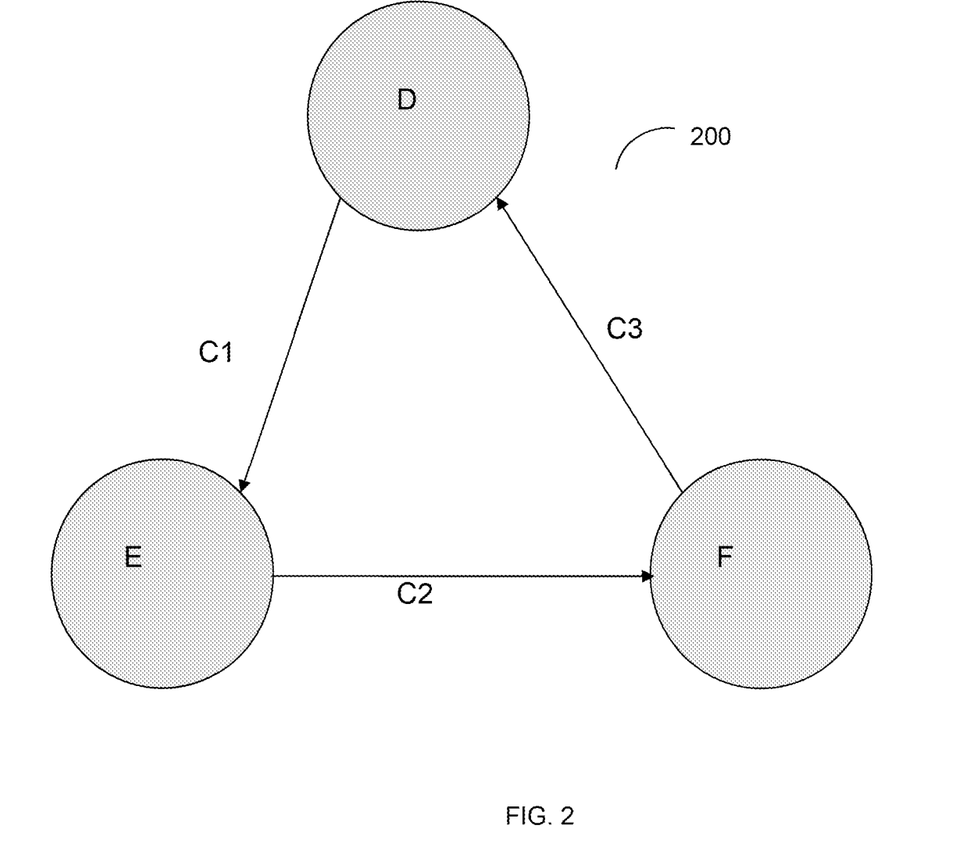
FIG. 2 is a calibration graph of an extrinsic calibration optimization, according to an embodiment.

FIG. 2 shows calibration graph 200 of an extrinsic calibration optimization, according to an embodiment. In the example, each extrinsic calibration is usually performed between two selected sensors 110. Also, a "closed loop" is formed when all the calibration pairs amongst the sensors 110 are calculated so that a path from any sensor 110 and its pair to other sensor pairs and back to itself can be completed. That is, three pairwise calibrations for the three sensors 110 are conducted. The sensors 110 form a closed loop when each sensor is considered as a graph node, and each pairwise calibration between the sensors that is performed is visualized in FIG. 2 as a graph edge. Therefore, the three pairwise calibrations for the three sensors are shown as a triangular "closed loop," by which the optimization technique may be performed to improve optimization accuracy.

In the embodiment, three sensors 110D, 110E, and 110F, such as sensors 110 mounted on a vehicle are shown. During calibration the sensors 110 D-F may point towards an object with an overlapping field of view of the same scene, forming a closed loop with stereo-sensor calibration parameters between each of the sensor pairs. For simplicity purposes, the sensors 110 may be cameras. Here, three separate extrinsic calibrations, D-E (C1), E-F (C2), and F-D (C3) each between the respective pair of sensors 110 are conducted, forming a "loop" of size three.

Additionally, each of the extrinsic pairwise calibration, is a rigid transformation that has six parameters, three for rotation and three for translation. Rotation describes roll, pitch, and yaw angles, while translation describes positions in x, y, and z axis. The six parameters are then converted into a 4×4 matrix of rigid transformation, which is a convenient representation of a rigid transformation, in which linear algebra may be applied to perform matrix calculation. Thus, the three extrinsic calibrations will produce three 4×4 matrices. Because the three calibrations form a loop, ideally the product of the three matrices should equal to an identity matrix that has "1" as the diagonal elements, with all other elements as "0". However, due to calibration errors, the product would be slightly different from the identity. Therefore, loop constraint application, where a calibration loop is applied so the product of the matrices becomes equal to the identity matrix, is used to modify each calibration slightly to reduce its error.

As described above, C1, C2, C3 are the three extrinsic calibrations before optimization. C1, C2, and C3 each is a vector of size six, corresponding to the six parameters of the extrinsic calibration. C1, C2, and C3 form a calibration loop of size three. After optimization is applied, the extrinsic calibration parameters become C1', C2', and C3'. Let M(C) be the 4×4 matrix converted from the calibration C. Also, I is the identity matrix describing the ideal values.

Based on the above, the optimization may be described as a minimization equation:

$$\text{Minimize } \|C1'-C1\|^2 + \|C2'-C2\|^2 + \|C3'-C3\|^2 \text{ such that } M(C3')*M(C2')*M(C1')=1 \quad (1)$$

Rearranging the constraint, the following equation is obtained:

$$M(C3') = (M(C1'))^{-1} * (M(C2'))^{-1} \quad (2)$$

Thus $C3' = M^{-1}((M(C1'))^{-1} * (M(C2'))^{-1}) \quad (3)$

After substituting the calculated C3' in equation (3) back into equation (1), the problem becomes:

$$\text{Minimize } \|C1'-C1\|^2 + \|C2'-C2\|^2 + \|M^{-1}((M(C1'))^{-1} * (M(C2'))^{-1}) - C3\|^2 \quad (4)$$

This is a least-squares minimization problem solvable by the Levenberg Marquardt algorithm. That is, the two vector parameters, C1' and C2', are initialized as C1 and C2 respectively (i.e., That is, C1'=C1, and C2'=C2) before applying the Levenberg Marquardt algorithm.

After running the Levenberg Marquardt algorithm, the resulting C1', C2' and C3' are the new optimized extrinsic calibration values. By using the loop constraint, where 1: M(C3')*M(C2')*M(C1')=I, and where the product of all calibrations in a loop must be equal to identity, error in each calibration may be reduced. That is, with the embodiment, it has been shown that the calibration errors with respect to ground truth may be reduced by up to ⅓ using this optimization method.

Note that each calibration Ci contains three translation distances and three rotational angles, such that Ci'-Ci is a vector with six numbers. Therefore, a norm calculation is conducted during the optimization to convert the vector into a single combined number after applying a conversion constant, ||Ci||, which involves a ratio between the distances and angles. That is, to combine values of three angles and three distances in the vector into a single number, a conversion constant is needed. Therefore, a constant ratio is specified to balance the change in angles versus the change in distances for the calibrations.

In general, for a calibration loop of size n, we minimize index i going from 1 to n as $\Sigma^n \|Ci'-Ci\|^2$ such that $\Pi^n M(Ci')=I$. After optimization, the error of each calibration can be reduced by up to 1/n.

The previous formulation assumes that the error is evenly distributed among all calibrations. Since different sensor types often have very different amounts of error, it is expected that different calibration types will have very different amounts of error. During optimization, the algorithm adjusts the accurate calibrations less while adjusting the less accurate calibrations more. If error is not evenly distributed, let wi be the relative amount of error in Ci. Wi will be larger for less accurate calibrations and smaller for more accurate ones. The wi's are typically set empirically based on an engineer's experience. After the wi's are assigned, instead of equation (1), we can minimize $\Sigma^n \bar{i}^2 \|i'-i\|^2$ to account for the uneven distribution of error.

Figure 3:
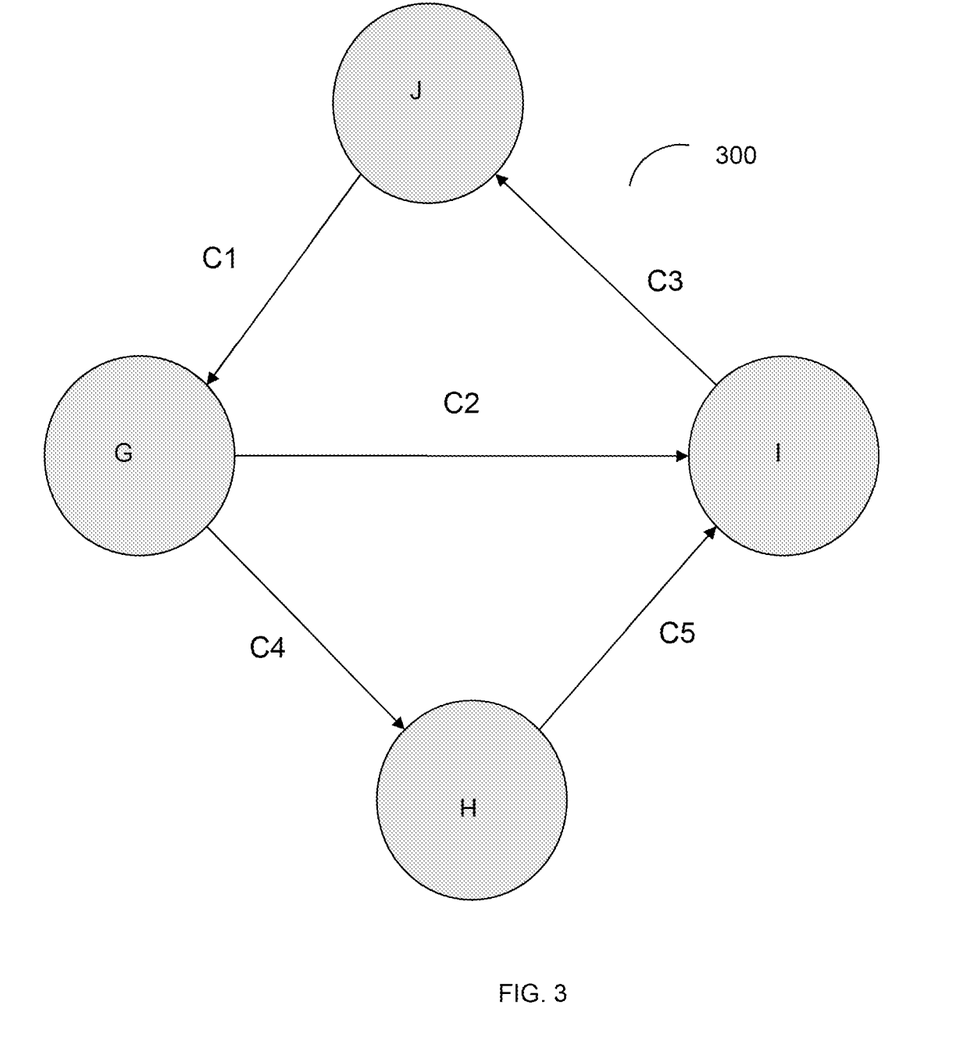
FIG. 3 is a calibration graph of an extrinsic calibration optimization, according to an embodiment.

FIG. 3 shows a calibration graph 300 of an extrinsic calibration optimization, according to an embodiment. Here, calibration is performed with pairs of sensors 110 that form multiple loops. Hence the optimization is more complex when compared to the case illustrated in FIG. 2. In FIG. 3, all the loops in the graph should be optimized simultaneously to minimize the error in the entire system consistently. In the embodiment, there are two loops of size three.

As such, a loop constraint is placed on the loops simultaneously. The following equation describes the optimization:

$$\text{Minimize } \Sigma_{i=1}^{5}(Ci'-Ci)^2 \quad (5)$$

so that $$M(C3')*M(C2')*M(C1')=I \quad (6)$$

and $$M(C5')*M(C4')*M(C2')^{-1}=I \quad (7)$$

Here, i is an index from 1 to 5. Ci is any calibration C1 to C5. Here, the equation minimizes the error in the entire system consistently, and C1 to C5 are all optimized instead of a subset. Also, there is no need to apply the loop constraint to the bigger loop formed by C1, C4, C5, C3, as the loop constraint of these loops will be satisfied automatically if the two smaller loops satisfy the constraint. In general, optimization only needs to be applied to the innermost loops in any calibration graph, with a bigger loop being formed by more calibrations and sensors, while a smaller loop being formed with fewer calibrations and sensors, with the smallest loop possible being formed with three sensors and three calibrations. If the innermost loops all satisfy the loop constraint, then all outer loops will satisfy the loop constraint automatically.

The formulation to optimize all of the inner loops, as shown in equations 5-7 makes use of all calibrations and all loop constraints. That is, equations 5-7 uses the loop constraints to optimize calibrations C1-C5. Similar derivations may be performed to equations 2-4 to convert into a form that may be fed into a standard optimization library. As a result, improved calibrations may be obtained for C1-C5, and the results of the optimization will improve all calibrations in the graph.

Using Calibration Loop Residual Error to Estimate Extrinsic Calibration Error

In addition to minimizing calibration error, we often need to estimate the errors in calibrations. If one has the perfect ground-truth calibration values, one can simply compare them with the values obtained from a calibration process. However, obtaining very accurate ground-truth calibration is extremely difficult. Here, a method is described to estimate the calibration error computational using the loop constraint.

Here, residual error of a calibration loop is defined consisting of n calibrations $_1, \ldots, _n$ as $^{-1}(_{j=n}^{1}M(_j))$. Intuitively, the residual error is the deviation of the calibrations from the loop constraint. The residual error is a vector of 6 parameters. For perfect calibrations, the residual error would be a 0 vector (all 0's). Using numerical simulation, we observed a linear relationship between the error in each individual calibration versus the residual error. For a loop of size 3, given equal calibration error, the individual calibration error is approximately 0.6 of the calibration loop residual error. (I.e., If the translational residual error is (x, y, z), the estimated translational error for each individual calibration will be $0.6^{\sqrt{222}}$). Similarly, if the rotational residual error is (ϕ,θ,ψ), the estimated rotational error for each individual calibration will be $0.6^{\sqrt{222}}$. This constant factor will be different depending on the size of the loop. Thus, this is an easy method to estimate the error in each individual calibration.

Temporal Calibration

Figure 4:
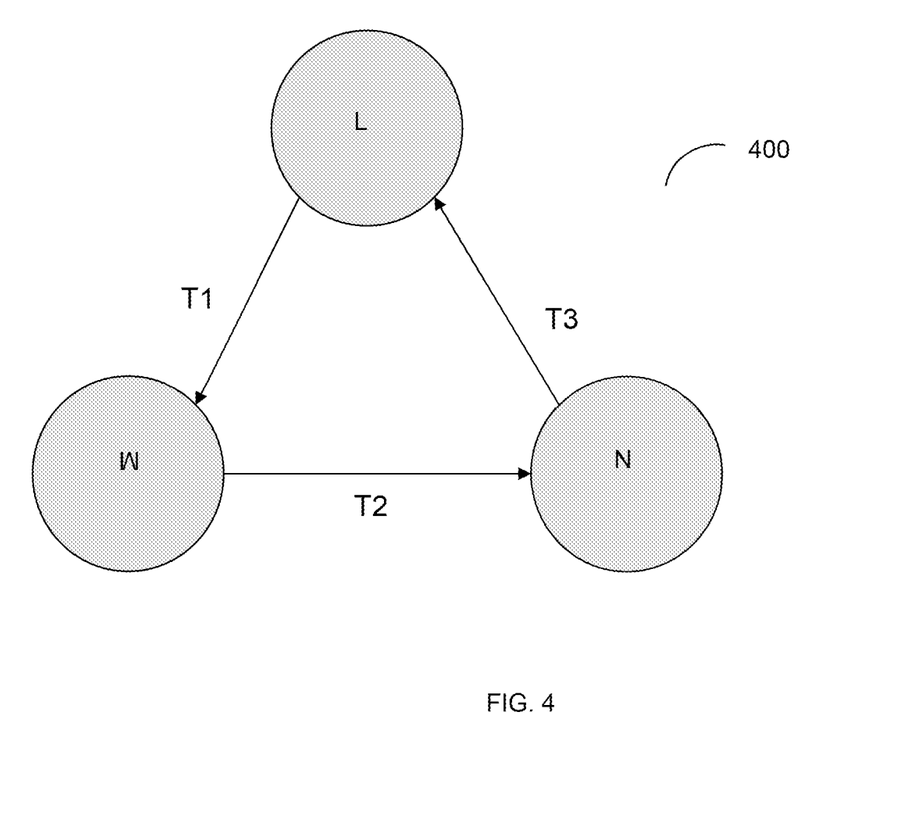
FIG. 4 is a calibration graph of an extrinsic calibration optimization, according to an embodiment.

FIG. 4 shows a calibration graph 400 of a temporal calibration optimization, according to an embodiment. Temporal calibration measures the difference in timestamp between two different sensors. Each temporal calibration has only one number to contemplate—the time difference. Similar to extrinsic calibrations, several temporal calibrations can also form a loop. For temporal calibration optimization, the sum of the calibrations in a loop should be zero. Similar to extrinsic calibrations described above in FIGS. 2 and 3, loop constraint can improve the accuracy of each calibration:

In FIG. 4, T1, T2, and T3 are the 3 temporal calibrations before optimization. T1, T2, and T3 form a calibration loop (L, M, N) of size 3. Also, setting T1', T2', T3' as the temporal calibrations after optimization, the optimization itself may be formulated as a minimization equation (e.g., loop constraint) below:

$$\text{Minimize } (T1'-T1)^2+(T2'-T2)^2+(T3'-T3)^2 \text{ such that } T1'+T2'+T3'=0 \quad (8)$$

Rearranging the constraint, we have:

$$T3'=-T1'-T2' \quad (9)$$

After substituting for T3', the equation becomes a least-squares minimization equation solvable by the Levenberg Marquardt algorithm:

$$\text{Minimize } (T1'-T1)^2+(T2'-T2)^2+(-T1'-T2'-T3)^2 \quad (10)$$

The two parameters, T1' and T2', are initialized as T1 and T2 respectively.

After running the Levenberg Marquardt algorithm, the resulting T1', T2' and T3' become the new optimized temporal calibration values. By using the loop constraint, error in each calibration may be reduced by up to ⅓.

Therefore, in general, for a temporal calibration loop of size n, we minimize $\Sigma_{i=1}^{n}(Ti'-Ti)^2$ such that $\Sigma_{i=1}^{n}Ti'=0$.

Optimizations for larger loops and temporal calibration graphs are similar to that of the extrinsic calibrations.

Figure 5:
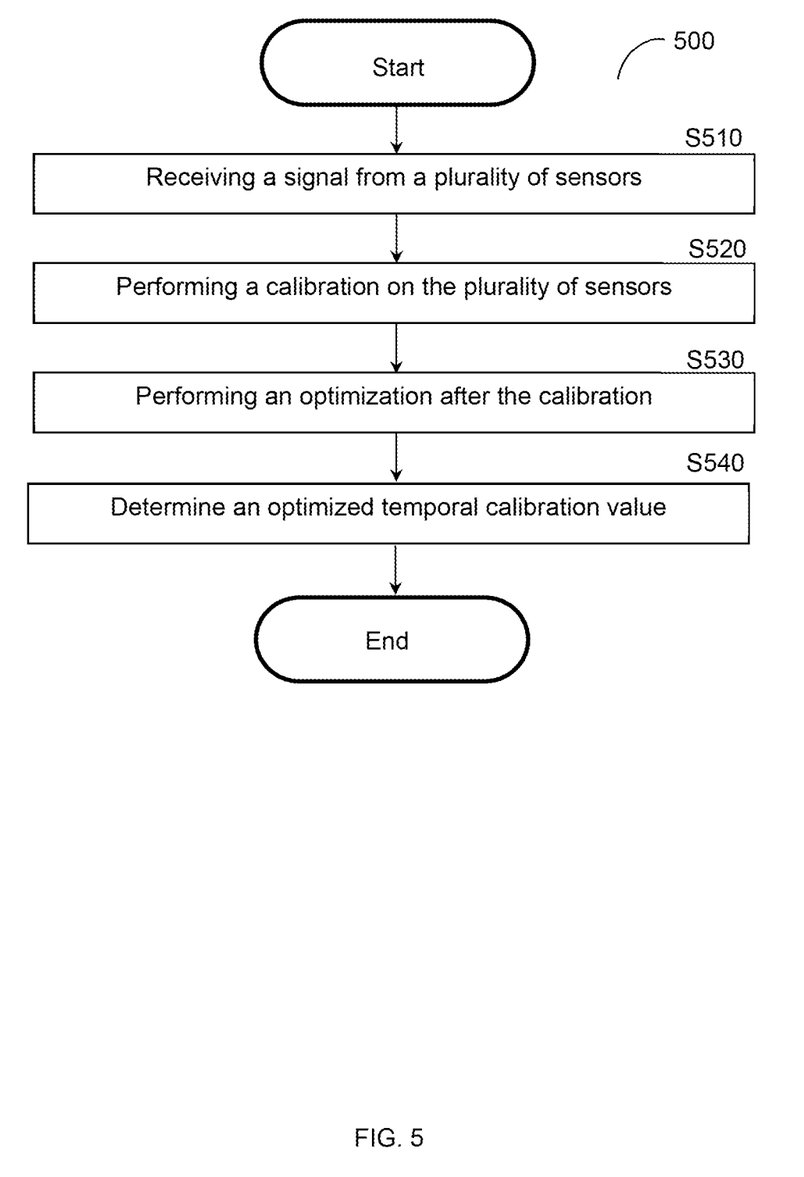
FIG. 5 is a method of optimizing calibration, according to an embodiment.

FIG. 5 is a method 500 of optimizing calibration, according to an embodiment. At S510, a signal from a plurality of sensors is received. Then, at S520 a calibration on the plurality of sensors is performed. Afterwards, at S530 an optimization is performed after the calibration. Then at S540, an optimized temporal calibration value is determined by applying a loop constraint based on the formed calibration loop. Afterwards, calibration may be restarted again on the plurality of sensors, along with the optimization.

Figure 6:
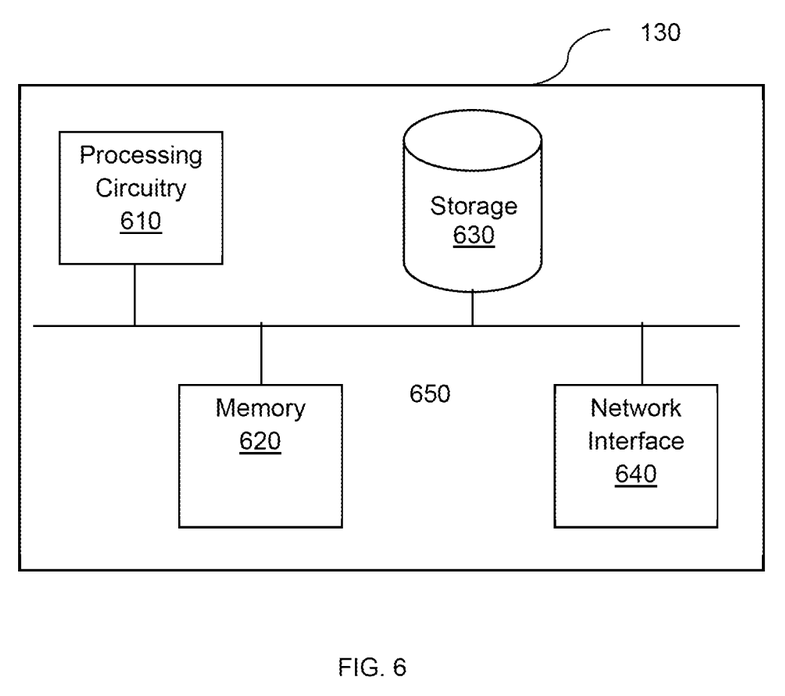
FIG. 6 is an example schematic diagram of a system according to an embodiment.

FIG. 6 is an example schematic diagram of a system 130 according to an embodiment. The system 130 includes a processing circuitry 610 coupled to a memory 620, a storage 630, and a network interface 640. In an embodiment, the components of the system 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 620 may be volatile (e.g., RAM, etc.), non-volatile (e.g., ROM, flash memory, etc.), or a combination thereof. In one configuration, computer readable instructions to implement one or more embodiments disclosed herein may be stored in the storage 630.

In another embodiment, the memory 620 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, CD-ROM, Digital Versatile Disks (DVDs), or any other medium which can be used to store the desired information.

The network interface 640 allows the system 130 to communicate with the database 140 for the purpose of, for example, receiving data, sending data, and the like. Further, the network interface 640 allows the system 130 to communicate with the sensors 110 for the purpose of collecting vehicle data.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A calibration optimization method, comprising:
   receiving, by one or more processors, signals corresponding to a plurality of sensors, each of the plurality of sensors comprising a camera defining three rotation values and three translation values, the three rotation values comprising a roll, pitch and yaw value, the three translation values comprising an x-, y- and z-axis, each of the plurality of sensors comprise an overlapping field of view with at least another one of the plurality of sensors, forming a closed loop with stereo-sensor calibration between sensor pairs;
   performing, by the one or more processors, a calibration on the plurality of sensors, the calibration having a vector size corresponding to a plurality of parameters of the calibration, the plurality of parameters of the calibration comprising roll, pitch and yaw parameters, and x-, y-, and z-axis parameters; and
   performing, by the one or more processors, an optimization of the calibration on the plurality of sensors wherein the optimization includes a minimization that includes applying a loop constraint to obtain an optimized calibration value, and
   minimizing $\|C1'-C1\|^2 + \|C2'-C2\|^2 + \|C3'-C3\|^2$ such that $M(C3')*M(C2')*M(C1')=I$, wherein:
   C1, C2, and C3 each represents a result of the calibration performed on a pair of sensors from the plurality of sensors,
   C1', C2', C3' each represents a result of the optimization of the calibration for the respective C1, C2, and C3,
   M(C1'), M(C2'), and M(C3') represent a 4×4 matrix converted from respective calibrations C1', C2', and C3' towards which the optimization is applied, and
   I is an identity matrix describing an ideal value; and
   minimizing errors of subsequent signals from the plurality of sensors based on applying the optimized calibration value to the plurality of sensors corresponding to the optimization.

2. The method of claim 1, wherein the calibration comprises an extrinsic calibration, and the minimization further comprises subjecting the minimized values to a Levenberg Marquardt algorithm.

3. The method of claim 1, further comprising estimating an error in the calibration based on a calibration loop residual error, wherein the calibration loop residual error is a deviation of the calibration from the loop constraint.

4. The method of claim 3, wherein the estimated error in the calibration is determined based on one of a size of the loop constraint, or a vector of a plurality of parameters.

5. A non-transitory computer readable medium having stored thereon instructions for causing a processing circuitry to execute a process, the process comprising:
receiving, by the processing circuitry, a signal from each of a plurality of sensors that are selected, each of the plurality of sensors comprising a camera defining three rotation values and three translation values, the three rotation values comprising a roll, pitch and yaw value, the three translation values comprising an x-, y- and z-axis and an overlapping field of view with at least another one of the plurality of sensors, forming a closed loop with stereo-sensor calibration between sensor pairs;
performing, by the processing circuitry, a calibration on the plurality of sensors;
performing, by the processing circuitry, an optimization of the calibration on the signals from the plurality of sensors after the calibration is performed, and a minimization comprising minimizing $\|C1'-C1\|^2+\|C2'-C2\|^2+\|C3'-C3\|2$ such that $M(C3')*M(C2')*M(C1')=I$, wherein:
C1, C2, and C3 each represents a result of the calibration performed on a pair of sensors from the plurality of sensors,
C1', C2', C3' each represents a result of the optimization of the calibration for the respective C1, C2, and C3,
M(C1'), M(C2'), and M(C3') represent a 4×4 matrix converted from respective calibrations C1', C2', and C3' towards which the optimization is applied, and
I is an identity matrix describing an ideal value;
determining, by the processing circuitry, an optimized calibration value by applying a loop constraint; and minimizing errors of subsequent signals from the plurality of sensors based on applying the optimized calibration value to the plurality of sensors corresponding to the optimization.

6. The non-transitory computer readable medium of claim 5, wherein the calibration comprises an extrinsic calibration, and the minimization further comprises subjecting the minimized values to a Levenberg Marquardt algorithm.

7. The non-transitory computer readable medium of claim 5, wherein the calibration comprises a temporal calibration, and
the minimization comprises:
minimizing $(T1'-T1)^2+(T2'-T2)^2+(T3'-T3)^2$ such that $T1'+T2'+T3'=0$, wherein:
T1, T2, and T3 each represents a result of the temporal calibration performed on a pair of sensors from the plurality of sensors, and
T1', T2', T3' each represents a result of the optimization of the temporal calibration for the respective T1, T2, and T3; and
subjecting the minimized values to a Levenberg Marquardt algorithm.

8. The non-transitory computer readable medium of claim 7, wherein the temporal calibration further comprises measuring a time difference in timestamp amongst the plurality of sensors.

9. The non-transitory computer readable medium of claim 5, further comprising estimating an error in the calibration based on a calibration loop residual error, wherein the calibration loop residual error is a deviation of the calibration from the loop constraint.

10. The non-transitory computer readable medium of claim 9, wherein the estimated error in the calibration is determined based on one of a size of the loop constraint, or a vector of a plurality of parameters.

11. A sensing system, comprising:
a plurality of sensors, each of the plurality of sensors comprising a camera defining three rotation values and three translation values, the three rotation values comprising a roll, pitch and yaw value, the three translation values comprising an x-, y- and z-axis, each of the plurality of sensors comprise an overlapping field of view with at least another one of the plurality of sensors, forming a closed loop with stereo-sensor calibration between sensor pairs;
a processing circuitry; and
a memory, the memory comprising instructions that, when executed by the processing circuitry, configure the sensing system to:
receive, by the processing circuitry, signals corresponding to the plurality of sensors;
perform, by the processing circuitry, a calibration on the plurality of sensors, the calibration having a vector size corresponding to a plurality of parameters of the calibrations, the plurality of parameters of the calibration comprising roll, pitch and yaw parameters, and x-, y-, and z-axis parameters;
perform, by the processing circuitry, an optimization of the calibration on the plurality of sensors, wherein:
the calibration includes an extrinsic calibration, and
the optimization includes a minimization that includes applying a loop constraint to obtain an optimized calibration value, the minimization comprising:
minimizing $\|C1'-C1\|^2+\|C2'-C2\|^2+\|C3'-C3\|2$ such that $M(C3')*M(C2')*M(C1')=I$, wherein:
C1, C2, and C3 each represents a result of the calibration performed on a pair of sensors from the plurality of sensors,
C1', C2', C3' each represents a result of the optimization of the calibration for the respective C1, C2, and C3,
M(C1'), M(C2'), and M(C3') represent a 4×4 matrix converted from respective calibrations C1', C2', and C3' towards which the optimization is applied, and
I is an identity matrix describing an ideal value; and minimizing errors of subsequent signals from the plurality of sensors based on applying the optimized calibration value to the plurality of sensors corresponding to the optimization.

12. The sensing system of claim 11, wherein the calibration comprises a temporal calibration, and the minimization comprises:
minimizing $(T1'-T1)^2+(T2'-T2)^2+(T3'-T3)^2$ such that $T1'+T2'+T3'=0$, wherein:
T1, T2, and T3 each represents a result of the temporal calibration performed on a pair of sensors from the plurality of sensors, and
T1', T2', T3' each represents a result of the optimization of the temporal calibration for the respective T1, T2, and T3; and
subjecting the minimized values to a Levenberg Marquardt algorithm.

13. The sensing system of claim 12, wherein the temporal calibration further comprises:
measuring a time difference in timestamp amongst the plurality of sensors.

14. The sensing system of claim 11, wherein the sensing system is further configured to estimating an error in the calibration based on a calibration loop residual error, wherein the calibration loop residual error is a deviation of the calibration from the loop constraint.

15. The sensing system of claim 14, wherein the estimated error in the calibration is determined based on one of a size of the loop constraint, or a vector of a plurality of parameters.

16. A calibration optimization method, comprising:
   receiving, by one or more processors, signals corresponding to a plurality of sensors, each of the plurality of sensors comprising a camera defining three rotation values and three translation values, the three rotation values comprising a roll, pitch and yaw value, the three translation values comprising an x-, y- and z-axis, each of the plurality of sensors comprising an overlapping field of view with at least another one of the plurality of sensors, forming a closed loop with stereo-sensor calibration between sensor pairs;
   performing, by the one or more processors, a calibration on the plurality of sensors, the calibration having a vector size corresponding to a plurality of parameters of the calibration, the plurality of parameters of the calibration comprising roll, pitch and yaw parameters, and x-, y-, and z-axis parameters; and
   performing, by the one or more processors, an optimization of the calibration on the plurality of sensors, wherein the optimization comprises a minimization that comprises applying a loop constraint to obtain an optimized calibration value, and minimizing $(T1'-T1)^2+(T2'-T2)^2+(T3'-T3)^2$ such that $T1'+T2'+T3'=0$, wherein:
   T1, T2, and T3 each represents a result of the calibration performed on a pair of sensors from the plurality of sensors, and
   T1', T2', T3' each represents a result of the optimization of the calibration for the respective T1, T2, and T3; and minimizing errors of subsequent signals from the plurality of sensors based on applying the optimized calibration value to the plurality of sensors corresponding to the optimization.

17. The method of claim 16, wherein the calibration comprises a temporal calibration, and the minimization further comprises applying a Levenberg Marquardt algorithm to the minimized values.

18. The method of claim 17, wherein the temporal calibration further comprises:
   measuring a time difference in timestamp amongst the plurality of sensors.

* * * * *